Jan. 22, 1929. 1,699,634
T. J. SMULSKI
SQUEEGEE
Filed Oct. 9, 1924
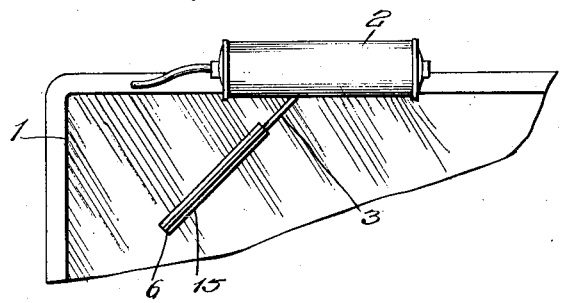
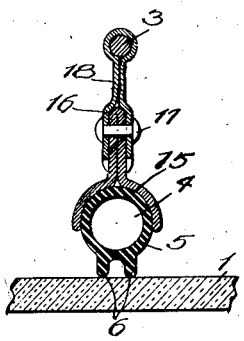
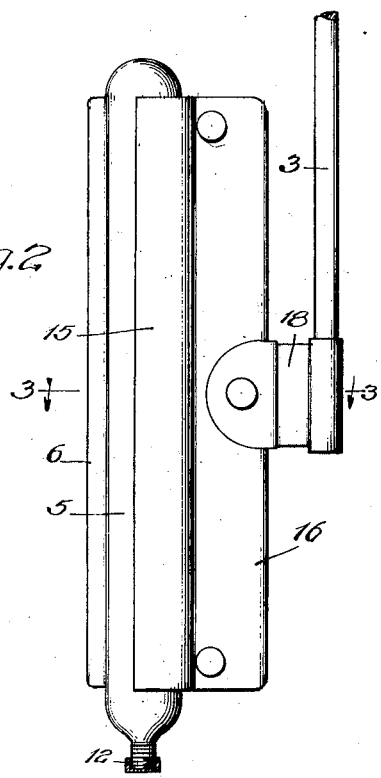
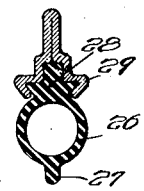
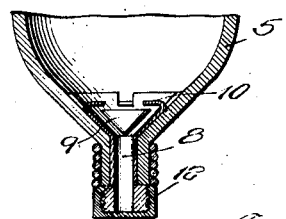
Inventor
Theodore J. Smulski Patented Jan. 22, 1929.

1,699,634

UNITED STATES PATENT OFFICE.

THEODORE J. SMULSKI, OF LAKE ZURICH, ILLINOIS, ASSIGNOR TO THE ANDERSON CO., OF GARY, INDIANA, A CORPORATION OF INDIANA.

SQUEEGEE.

Application filed October 9, 1924. Serial No. 742,575.

My invention belongs to that class of devices known as squeegees and relates more particularly to an improved type of squeegee or wiper adapted to be used in connection with automatic devices such as windshield wipers, which are operated by means of a vacuum, pressure or electrically, the particular operating mechanism itself forming no part of the present invention as any automatic motor or manually actuated mechanism may be employed. The invention has among its objects the production of a device of the kind described that is simple, reliable, durable, compact, efficient and satisfactory for use wherever found applicable. More particularly the same has as an object the production of a device of the kind described which will clean uniformly throughout its length and travel and will be efficient under all weather conditions and be operative to remove snow and thin coatings of ice or sleet from a windshield. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 is a view in elevation of a portion of a windshield with an automatic wiper applied thereto;

Fig. 2 is a view in elevation of the wiper itself;

Fig. 3 is a sectional view taken substantially on line 3—3 of Fig. 2;

Fig. 4 is a sectional view through a portion of the tubular body at the valve end;

Fig. 5 is a sectional view similar to Fig. 3 with a slightly modified construction; and Fig. 6 is a sectional view of another form.

Referring to the drawings, in which the preferred embodiment of the invention is shown, 1 represents a windshield, for example, as used on an automobile or any transparent panel or window from which it is desired to remove rain, snow or the like on the exterior so as to give a clear vision. The same may represent an automobile windshield, a street car front window, a locomotive cab window, or the like. I have shown in the figures a source of power or motor 2, arranged to actuate or swing the arm 3, it being understood, as before mentioned, that the motor 2 represents a vacuum motor, pressure motor, electric motor, or any equivalent for any of them, or merely a manually operated control or actuating device arranged for convenient operation by the operator. The movable arm or member 3 may swing in an arc of a circle or move across the pane 1, its movement depending upon the type of actuating mechanism 2 that is employed. The member 3 carries the wiper or squeegee proper, which contacts with and moves over the pane of glass or the like, wiping off or squeegeeing the same.

With the usual device of this kind, it has been customary to make the squeegee or wiper itself of more or less light, flexible material such as rubber, and the arm 3 is often more or less of a light wire which in itself has some resiliency or spring action. If the arm is properly adjusted, under ordinary conditions such as during rain or shower, the device will operate more or less in a satisfactory manner. However, if not properly adjusted, or the motor mounting is not just so, or the windshield frame is warped or twisted, or for any other reason the contact of the squeegee with the glass is not uniform throughout its length during its travel so that one portion bears heavier or contacts differently than another portion of the squeegee, the wiping will not be efficient and there will be a tendency for streaks, etc., impairing the vision almost as much and perhaps in some instances more than if no device for wiping the glass were employed. In the case of snow, sleet or ice forming on the glass, the device will not operate satisfactorily at all times, and it is necessary to wipe off the glass by hand. In the case of a thin coating of ice, the same may form almost as fast as it is wiped off by hand, the device being practically inoperative. This is due to a large extent to the extreme flexibility of the rubber wiper which flaps back and forth, rubbing first on one side and then on the other. Ordinarily, if a stiff piece of rubber is employed, then the pressure is not always uniform, and in fact it may press hard at one end of the stroke and light on the other or in varying degree throughout the length of the rubber.

My present invention is designed to overcome all of these defects in that there is provided a wiper having a yielding and elastic back, the wiper face being pressed to the face of the glass. Referring particularly to the embodiment shown in Figs. 2, 3 and 4, 5 represents a hollow body or tube arranged to contain air or equivalent cushioning material in the chamber 7. The wiping side of the tube is provided with one or more fins or blades 6 which constitute substantially a flange or flanges, the same having sufficient width and body so that it will collapse down on the glass but will be maintained in close contact therewith adjacent the outer edge. The same is also shown of sufficient width that it will not to any great extent flap back and forth. The air cushion gives extreme flexibility and yieldability to the same, however, to allow for irregularities so that the same is always maintained in operative equalized contact with the glass. It is generally preferred to provide this type of tube so that air may be admitted or exhausted therefrom, so as to vary the wiping pressure. I have shown a port 8 arranged at a convenient point, for example, at one end, 9 representing a valve which is retained against displacement by the prongs 10. The particular valve construction shown is provided with an outer cap 12 and gasket 13 so as to tightly seal the end. Obviously, any type of valve, for example a tire or inner tube valve of well-known construction may be employed in lieu of the valve mechanism illustrated.

I have shown the tube mounted in a holder 15 provided with a flange 16, pivotally connected at 17 to a bracket 18 suitably mounted on the arm 3, this construction allowing some pivotal adjustment during operation of the arm. The air pressure within the tube may be maintained as found desirable and varied for different weather conditions if preferred. Obviously, the tubular body 5 providing resiliency and yieldability, and for the equalizing of the pressure and contact across the same from end to end, the arm 3 may be made somewhat stiff so that the pressure on the glass may be made such as to give the most efficient operation of the device.

In Fig. 5 I have illustrated a similar arrangement in which 19 represents the tube, which, in this case, is formed or provided with a core 20 of yieldable material, such as sponge rubber or any equivalent for the purpose. The same is also shown provided with one or more flanges or blades 21 and is mounted in a holder 22 pivotally secured at 24 to the bracket 23 mounted on the arm 25. The construction shown in Fig. 6 is more or less similar, except but one blade 27 is shown, and that the tube is provided with a portion 28 arranged to dovetail in a back holder 29. Obviously, any equivalent construction may be employed for the purpose.

From the preceding it will be seen that the squeegee proper or wiping member is extremely yieldable and flexible and yet is maintained in firm contact with the glass throughout its length, and that the same may be maintained in contact with the glass with enough pressure so that except under exceptional circumstances, snow, sleet and ice will be removed from the line of vision represented by the space covered by the wiper in its movement. While, of course, there may be some chance for flexing of the body or parts intermediate or at the ends, the same does not flex to the extent that a thin rubber strip would flex; that is, fold down or collapse on the glass. As before mentioned, regardless of the irregularities in adjustments which render present devices inefficient, my improved wiper compensates for such irregularities, and the pressure is equalized throughout its length so that a uniform wiping is accomplished. The device is applicable to new constructions or to practically any of the constructions now on the market, regardless of the kind of power used for operating the same.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described, a tubular body of flexible material constituting an air chamber, said body provided with a valved port for the admission or discharge of air to or from said chamber, and a relatively narrow substantially stiff rib of suitable material arranged at one side of said body and having a free edge, said rib constructed to rest on a surface to be wiped and being sufficiently stiff to bear thereon with the free edge without sidewise flexing.

2. In a windshield wiper of the kind described, a body of elastic material provided with an air chamber extending substantially from end to end thereof, said body provided with a valved port at one end, whereby air pressure within the body may be regulated as desired, a plurality of substantially stiff spaced fins on one side of the body extending lengthwise from end to end and constituting wipers, said fins being so arranged as to engage the surface to be wiped at the edge of the fins.

3. In a device of the kind described and in combination, a substantially cylindrical body of elastic material provided with an air chamber extending substantially from end to end thereof, said body provided with a valved port at one end to permit the regulation of air pressure within the body, a relatively stiff rib extending substantially from end to end on said body, and having a free edge with which to engage a surface to be wiped.

In testimony whereof, I have hereunto signed my name.

THEODORE J. SMULSKI.